(12) United States Patent
Guevin

(10) Patent No.: US 9,572,131 B2
(45) Date of Patent: Feb. 14, 2017

(54) NETWORK SWITCH WITH INTEGRATED WIRELESS NETWORK RADIOS

(71) Applicant: Adtran, Inc., Huntsville, AL (US)

(72) Inventor: Thomas F. Guevin, Nashua, NH (US)

(73) Assignee: Adtran, Inc., Huntsville, AL (US)

( * ) Notice: Subject to any disclaimer, the term of this patent is extended or adjusted under 35 U.S.C. 154(b) by 145 days.

(21) Appl. No.: 14/657,838

(22) Filed: Mar. 13, 2015

(65) Prior Publication Data

US 2016/0270032 A1 Sep. 15, 2016

(51) Int. Cl.
*H04W 72/04* (2009.01)
*H04W 84/12* (2009.01)

(52) U.S. Cl.
CPC ............. *H04W 72/04* (2013.01); *H04W 84/12* (2013.01)

(58) Field of Classification Search
CPC .............................. H04W 72/04; H04W 84/12
See application file for complete search history.

(56) References Cited

U.S. PATENT DOCUMENTS

| 2012/0314665 | A1* | 12/2012 | Ishida | H01Q 21/28 370/329 |
| 2013/0095871 | A1* | 4/2013 | Soriaga | H04B 7/0691 455/503 |
| 2016/0227415 | A1* | 8/2016 | Carswell | H04W 16/10 |

* cited by examiner

*Primary Examiner* — Christopher Grey
(74) *Attorney, Agent, or Firm* — Smith Tempel Blaha LLC; Michael J. Tempel

(57) ABSTRACT

A wireless network switch device includes wired-network switch circuitry and wireless local-area network (WLAN) radio devices integrated together within a common housing. WLAN antennas that are distributed about the WLAN coverage area can be coupled to antenna ports on the device housing. Channels are assigned to the WLAN radio devices and corresponding antennas in a manner that promotes minimization of signal interference between adjacent WLAN radio devices in the housing as well between adjacent antennas.

19 Claims, 8 Drawing Sheets

NAP(A,B,2) = 1          RAP(P,Q,2) = 1
NAP(A,C,3) = 1          RAP(P,R,3) = 1

FIG. 5                FIG. 6

$$0 + 0 = 0$$
$$1/NAP(A,B,2) + 1/RAP(P,Q,2) = 1/1 + 1/1 = 2$$
$$1/NAP(A,C,3) + 1/RAP(P,R,3) = 1/1 + 1/1 = 2$$

FIG. 7

NAP(B,A,1) = 1  
NAP(B,C,3) = 1

RAP(Q,P,1) = 1  
RAP(Q,R,3) = 1/.707

1/NAP(B,A,1) + 1/RAP(Q,P,1) = 1/1 + 1/1 = 2  
                                              0 + 0 = 0  
1/NAP(B,C,3) + 1/RAP(Q,R,3) = 1/1 + .707 = 1.7

FIG. 10

NAP(C,A,1) = 1
NAP(C,B,2) = 1

FIG. 11

RAP(R,P,1) = 1
RAP(R,Q,2) = 1/.707

FIG. 12

1/NAP(C,A,1) + 1/RAP(R,P,1) = 1/1 + 1/1 = 2
1/NAP(C,B,2) + 1/RAP(R,Q,2) = 1/1 + .707 = 1.7
                               0 + 0 = 0

FIG. 13

NETWORK SWITCH WITH INTEGRATED WIRELESS NETWORK RADIOS

BACKGROUND

A wireless local area network (WLAN) is a digital communications network that allows a wireless network device to communicate with or access a computer network via a radio communication link. A common type of WLAN is known as "WiFi" or "802.11," the latter term in reference to the IEEE 802.11 set of standards that govern such networks. Such an 802.11 WLAN commonly comprises one or more access points (APs) that are each connected by a wired connection with a switch, router or similar networking device. Each AP includes an AP radio, an AP antenna, and AP control circuitry. The AP control circuitry commonly includes an Ethernet interface for forming the wired connection with the networking device. The networking device allows a wireless client device, such as a portable computer, smartphone, etc., to communicate with or access a computer network. It is common for the networking device to provide the wireless client device with a connection to the Internet.

A system in which AP antennas are located remotely from the corresponding AP radios may be referred to as a distributed antenna system (DAS). For example, as illustrated in FIG. 1, a DAS 10 may be installed in a building 11, such as an office building or hotel. The antennas 12, 14, 16, 18, etc., are distributed about the various rooms 20, 22, 24, etc., or other spatial regions of building 11, while the corresponding enclosures 26, 28, 30, 32, etc., which house the radio and control circuitry are installed in a centralized location, such as a wiring closet in a basement of building 11. Each such enclosure 26, 28, 30, 32, etc., houses the radio and control circuitry associated with one AP. In a large office building or hotel, dozens of such enclosures may be mounted in a rack or on a wall in the centralized location. In the example shown in FIG. 1, each of enclosures 26, 28, 30, 32, etc., is connected with a respective one of antennas 12, 14, 16, 18, etc., by one of a number of antenna cables 34, 36, 38, 40, etc., and connected with a network switch 42 by one of a number of Ethernet cables 44, 46, 48, 50, etc.

A DAS may carry not only 802.11 WLAN signals but also cellular telephone signals, reflecting a trend of convergence between these two wireless communications technologies. Each AP of such a DAS may include filter circuitry that splits the cellular telephone signals from the 802.11 WLAN signals.

The IEEE 802.11b/g standard defines 14 channels (though only 11 of those channels are commonly used in commercially available WLAN devices in the United States). One common scheme uses a channel set consisting of channels designated by the numbers "1," "6" and "11," while another common scheme uses a channel set consisting of channels designated by the numbers "1," "6," "11" and "14." In these schemes, channels "1," "6," "11" and "14" represent adjacent, non-overlapping channels or sections of the frequency spectrum.

It is desirable to assign channels to the APs using a scheme that minimizes the likelihood of interference between the signals carried by adjacent antennas. In the example shown in FIG. 1, the APs having adjacent antennas 12 and 14, which are characterized by coverage areas 52 and 54, respectively, would be assigned different channels from each other. For example, the AP having antenna 12 could be assigned channel "1," while the AP having antenna 14 could be assigned channel "6." Similarly, the AP having antenna 12 and the AP having antenna 16, which is characterized by a coverage area 56, would be assigned different channels from each other. So, for example, the AP having antenna 16 could be assigned channel "11." Likewise, the AP having antenna 14 and the AP having antenna 18, which is characterized by a coverage area 58, would be assigned different channels from each other. Algorithms are known that can aid in determining which channels to assign to which APs to minimize the likelihood of interference between signals carried by adjacent antennas.

SUMMARY

Embodiments of the invention relate to devices, methods, and computer program products for operation of a wireless network switch device having integrated WLAN radio devices. Channels are assigned to WLAN radio devices and corresponding antennas in a manner that promotes minimization of signal interference between adjacent WLAN radio devices as well between adjacent antennas.

In an exemplary embodiment, a device includes a housing, two or more WLAN radio devices mounted within the housing, wired-network switch circuitry mounted within the housing and coupled to the WLAN radio devices, and a processing system having a processor and memory mounted within the housing. Each WLAN radio device is configurable to operate on one of a plurality of channels. Each WLAN radio device is coupled to an antenna port on the housing. The processing system is configured to control a method that includes determining distances between pairs of antennas coupled to the antenna ports, determining distances between pairs of the WLAN radio devices, and assigning a channel to each WLAN radio device in response to the distances between pairs of the antennas and the distances between pairs of the WLAN radio devices.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 5 is an example of a list of adjacent antennas, channels assigned thereto and distances therebetween, for a first AP, in accordance with the exemplary method.

FIG. 6 is an example of a list of adjacent WLAN radio devices, channels assigned thereto and distances therebetween, for a first AP, in accordance with the exemplary method.

FIG. 7 is an example of a list of sums computed for a first AP, in accordance with the exemplary method.

FIG. 8 is an example of a list of adjacent antennas, channels assigned thereto and distances therebetween, for a second AP, in accordance with the exemplary method.

FIG. 9 is an example of a list of adjacent WLAN radio devices, channels assigned thereto and distances therebetween, for a second AP, in accordance with the exemplary method.

FIG. 10 is an example of a list of sums computed for a second AP, in accordance with the exemplary method.

FIG. 11 is an example of a list of adjacent antennas, channels assigned thereto and distances therebetween, for a third AP, in accordance with the exemplary method.

FIG. 12 is an example of a list of adjacent WLAN radio devices, channels assigned thereto and distances therebetween, for a third AP, in accordance with the exemplary method.

FIG. 13 is an example of a list of sums computed for a third AP, in accordance with the exemplary method.

DETAILED DESCRIPTION

Figure 2:
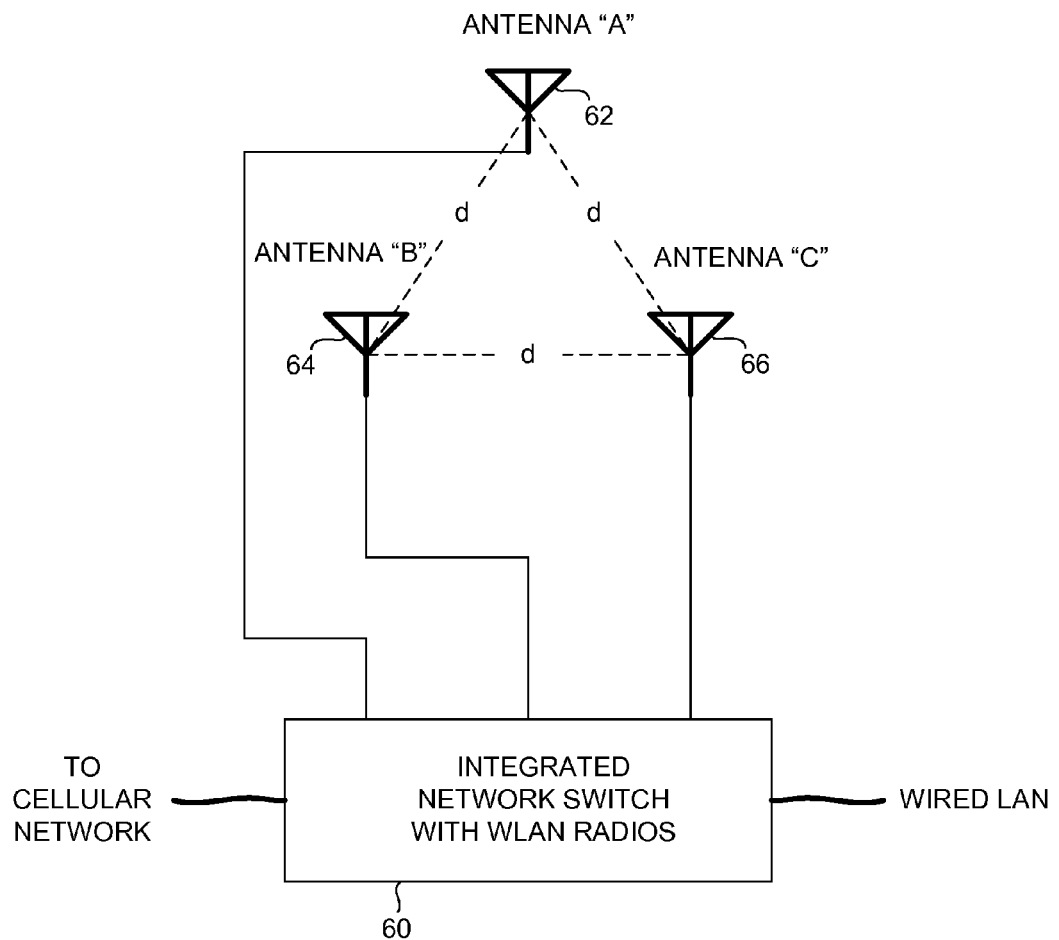
FIG. 2 is a block diagram of a system in which a network switch device having integrated WLAN radios is coupled to corresponding distributed antennas, in accordance with an exemplary embodiment of the invention.

As illustrated in FIG. 2, in an illustrative or exemplary embodiment of the invention, a network switch device 60 is coupled to an antenna ("A") 62, an antenna ("B") 64, and an antenna ("C") 66. Network switch device 60 can be coupled to or included as part of a wired LAN. Network switch device 60 also can be coupled to a cellular telephone network. Although the exemplary embodiment includes only three antennas 62, 64 and 66 for purposes of convenience and clarity of illustration, other embodiments (not shown) can include any number of such antennas coupled to such a network switch device. It also should be noted that the designations "A," "B" and "C" are used solely for purposes of clarity and convenience in describing an exemplary embodiment and are not intended to imply any order, arrangement, or other characteristic.

Figure 1:
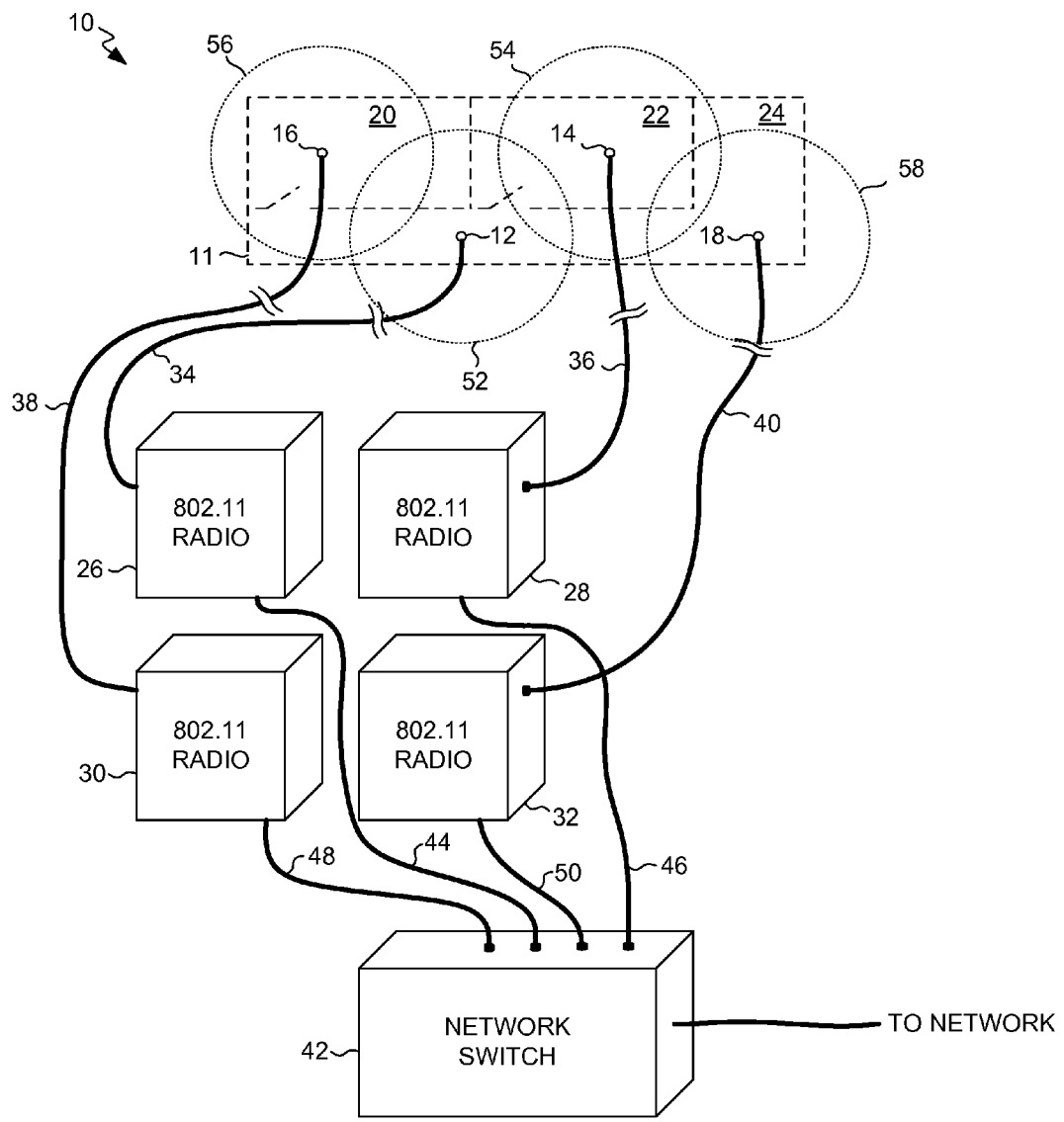
FIG. 1 is a generalized perspective view of a WLAN distributed antenna system (DAS), in accordance with the prior art.

Antennas 62-66 can be installed at a premises, such as a building, in a conventional manner. For example, they can be installed in the manner described above with regard to FIG. 1. Network switch device 60 can be installed at or near the premises and coupled to antennas 62-66 with conventional coaxial cables (not shown).

Figure 3:
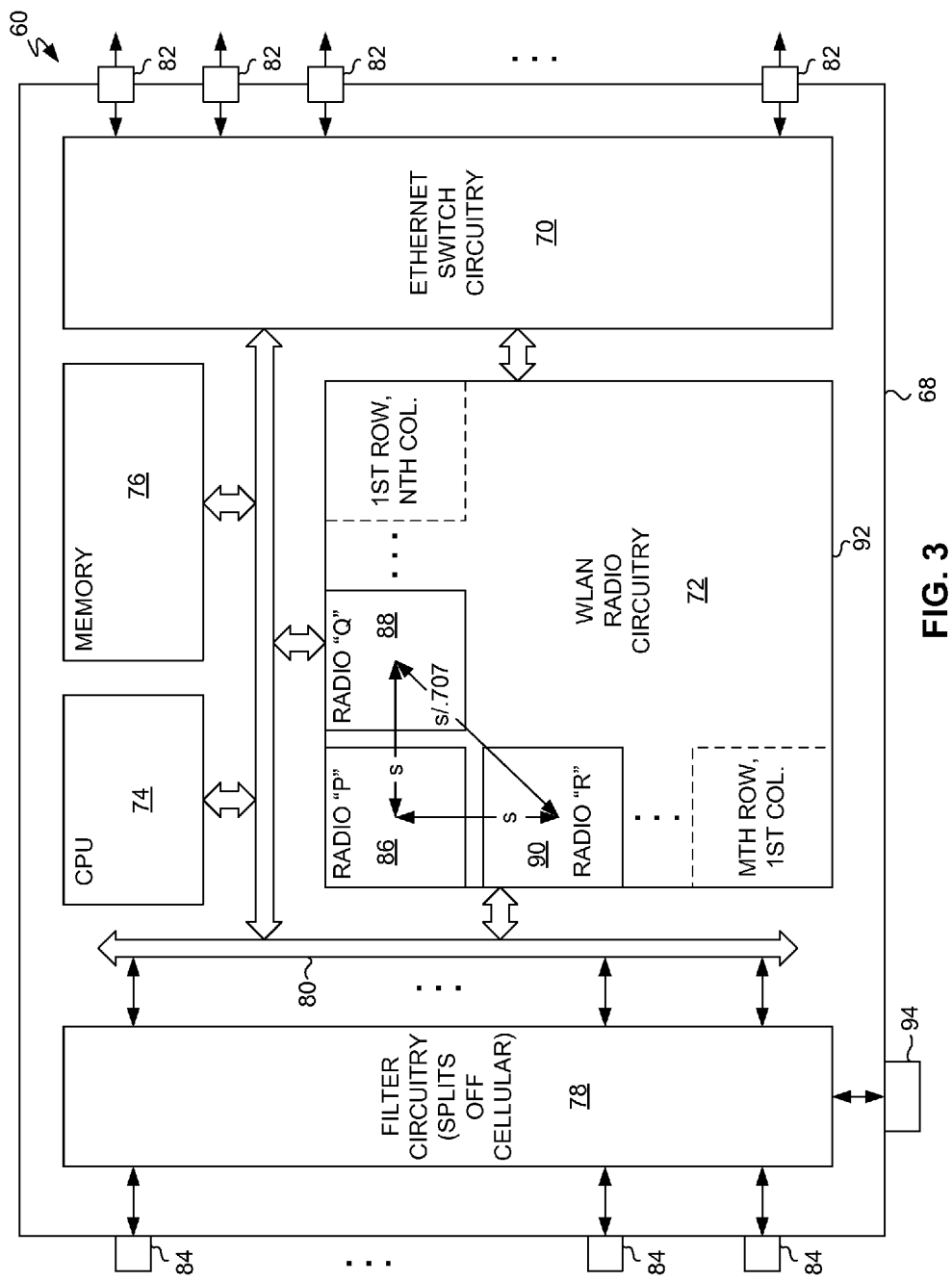
FIG. 3 is a block diagram of the network switch device of FIG. 2.

As illustrated in FIG. 3, network switch device 60 includes a housing 68. Within housing 68 are Ethernet switch circuitry 70 (i.e., wired-network switch circuitry), WLAN radio circuitry 72, processor 74 such as a central processing unit (CPU), a memory 76, filter circuitry 78, and one or more digital and analog buses or other interconnections 80 among the foregoing elements.

Multiple Ethernet ports 82 are mounted on housing 68. Network switch device 60 can be coupled into a wired LAN by connecting conventional Ethernet cables (not shown) to one or more Ethernet ports 82. Multiple antenna ports 84 are also mounted on housing 68. Network switch device 60 can be coupled to antennas 62-66 as shown in FIG. 2 (or, in other embodiments, any other such antennas) by connecting conventional coaxial cables (not shown) to one or more antenna ports 84. There can be any suitable number of Ethernet ports 82 and antenna ports 84.

In the exemplary embodiment, WLAN radio circuitry 72 includes a WLAN radio device ("P") 86, a WLAN radio device ("Q") 88, and a WLAN radio device ("R") 90. A potential problem addressed by the present invention is that the circuitry of each of WLAN radio devices 86-90 can undesirably emit RF signals that can interfere with the operation of the others. Such emitted signals can undesirably couple into the circuitry of others of WLAN radio devices 86-90. Although RF shielding (not shown) may be included, such shielding may not be sufficient to mitigate such cross-coupling or interference.

In the exemplary embodiment, WLAN radio devices 86-90 are arranged in a generally rectangular array defined by N rows and M columns, where M and N can be any numbers greater than one. For example, WLAN radio devices 86-90 can be mounted on a common substrate, such as a printed circuit motherboard 92. WLAN radio devices 86-90 can include, for example, electrical connectors (not shown) that can be plugged into mating connectors (not shown) on the surface of motherboard 92. In the exemplary embodiment, each of WLAN radio devices 86-90 may occupy a generally square or box-shaped region, such that the center each of WLAN radio devices 86-90 readily can be geometrically determined for purposes of the method described below. Nevertheless, in other embodiments (not shown), other such WLAN radio devices can have any other suitable shape. In the exemplary embodiment, each of WLAN radio devices 86-90 can comprise circuit components mounted on a square printed circuit board. Thus, in the exemplary embodiment, a surface of each of WLAN radio devices 86-90 is parallel to and adjacent a surface of motherboard 92 and parallel to the corresponding surfaces of other WLAN radio devices 86-90. In other embodiments, such radio devices can comprise printed circuit boards that are mounted perpendicularly to such a motherboard. Still other mounting configurations will occur readily to persons skilled in the art in view of these examples and other descriptions. Circuit traces (not shown) in motherboard 92 electrically connect WLAN radio devices 86-90 to interconnections 80, which in turn connect WLAN radio devices 86-90 to other elements of network switch device 60.

Although the exemplary embodiment includes only three WLAN radio devices 86-90 arranged in a rectangular array for purposes of convenience and clarity of description, other embodiments can include any number of such radio devices arranged in any suitable arrangement. It also should be noted that in the following descriptions of WLAN radio device ("P") 86, WLAN radio device ("Q") 88, and WLAN radio device ("R") 90 in the exemplary embodiment, the designations "P," "Q" and "R" are used solely for purposes of clarity and convenience and are not intended to imply any order, arrangement, or other characteristic.

In the exemplary embodiment, each of WLAN radio devices 86-90 is configured to operate in accordance with one or more WLAN standards. In operation, antennas 62-66 can communicate signals with wireless devices (not shown), such as laptop computers, smartphones, etc. In some instances, antennas 62-66 can communicate signals that conform to the 802.11 set of standards or similar WLAN standards, characterized by specified frequency bands, etc. In other instances, antennas 62-66 can communicate signals that conform to cellular telephone standards. Some of the well-known standards that may govern cellular telephone communication may include, for example, GSM, 3G, 4G, LTE, etc. Filter circuitry 78 serves as a splitter, to separate cellular telephone signals from WLAN signals. That is, filter circuitry 78 directs WLAN signals that it receives via antenna ports 84 to WLAN radio circuitry 72 and directs cellular telephone signals that it receives via antenna ports 84 to a cellular telephone signal port 94.

Each of WLAN radio devices 86-90 is coupled to a corresponding one of antenna ports 84. Thus, when antennas 62-66 are connected to those antenna ports 84, each of WLAN radio devices 86-90 is coupled to a corresponding one of antennas 62-66. The combination of one of WLAN radio devices 86-90 a corresponding one of antennas 62-66 can be referred to herein for convenience as an access point (AP). It should be noted that in other embodiments, a user can connect any such antenna to any such antenna port.

In the exemplary embodiment, each of WLAN radio devices 86-90 can be configured to operate on any one of three channels. The channels are referred to herein by the numbers "1," "2" and "3" for purposes of convenience and clarity in describing an exemplary embodiment. In other embodiments, there can be any number of channels, referred to by any type of numbering or other channel designation scheme.

Referring briefly again to FIG. 2, in the exemplary embodiment antennas 62-66 can be arranged in a triangular arrangement or topology. This triangular arrangement is intended to be merely exemplary for purposes of facilitating description of an exemplary embodiment. In other embodiments (not shown), any number of such antennas can be arranged in any other suitable arrangement or topology, as well understood by persons skilled in the art.

Figure 4A:
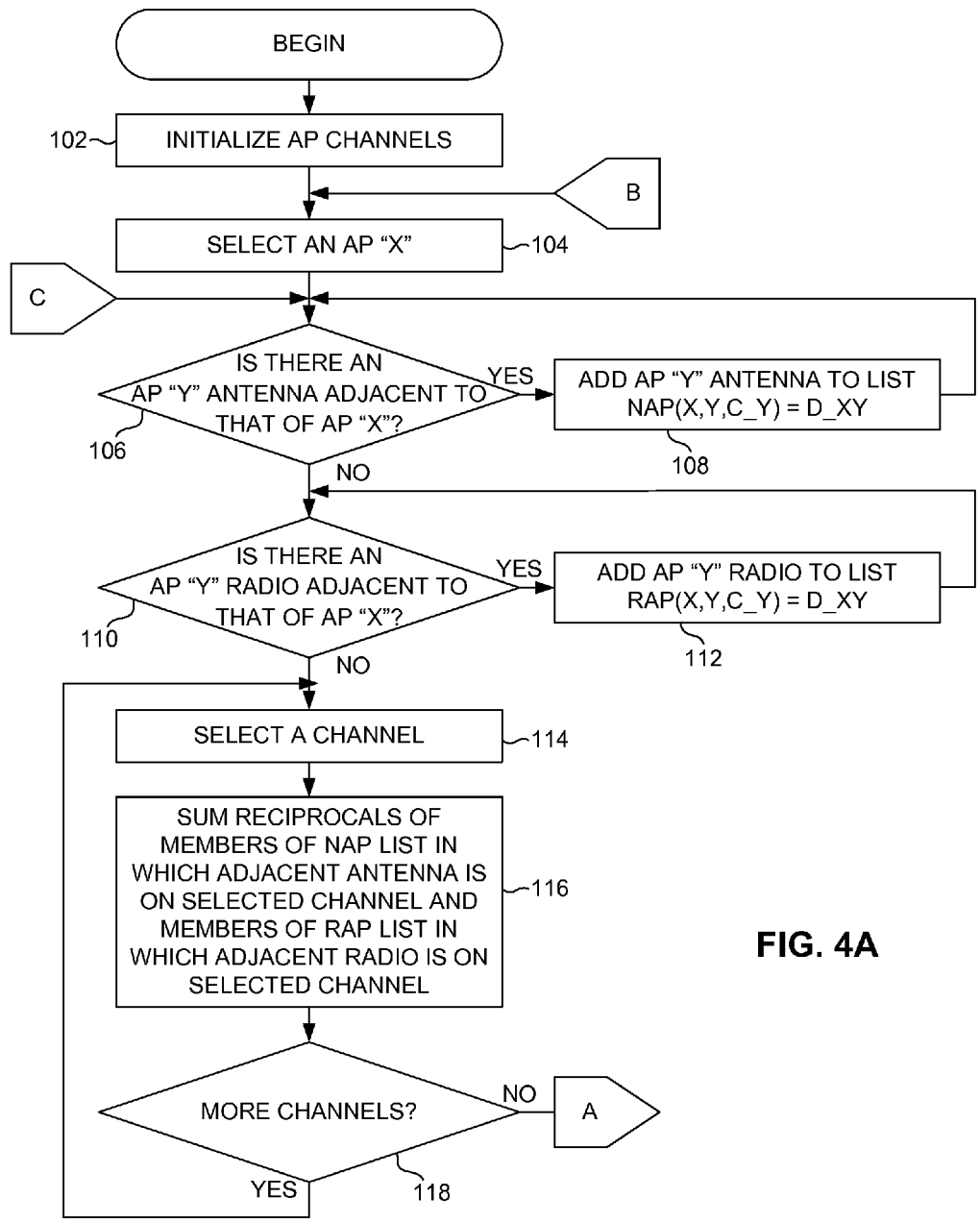
FIG. 4A is a flow diagram illustrating a method of operation of the network switch device of FIG. 3, in accordance with the exemplary embodiment.
Figure 4B:
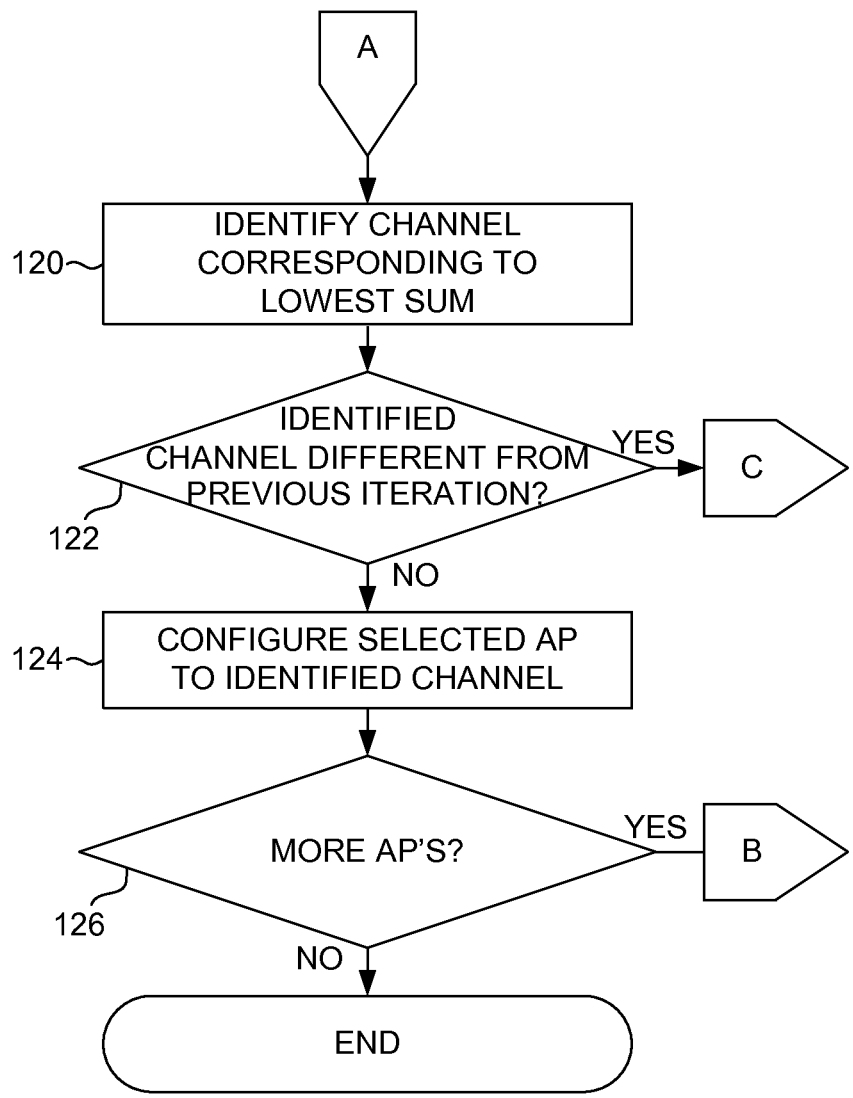
FIG. 4B is a continuation of the flow diagram of FIG. 4A.

The flow diagram of FIGS. 4A-4B illustrates an exemplary method by which network switch device 60 can operate. As indicated by block 102, the AP channels are initialized, i.e., set to initial values. For example: WLAN radio device ("P") 86 initially can be set to operate on channel "1"; WLAN radio device ("Q") 88 initially can be set to operate on channel "2"; and WLAN radio device ("R") 90 initially can be set to operate on channel "3." Accordingly, in this example: antenna ("A") 62, which corresponds to WLAN radio device ("P") 86 carries channel "1"; antenna ("B") 64, which corresponds to WLAN radio device ("Q") 88, carries channel "2"; and antenna ("C") 66, which corresponds to WLAN radio device ("R") 90, carries channel "3."

Block 104 begins a sub-method that is performed one or more times in a looping manner, each time with a different AP selected. For example, the first time that the sub-method is performed following initialization (block 102), the AP comprising WLAN radio device ("P") 86 and corresponding antenna ("A") 62 can be selected.

As indicated by block 106, it is determined whether there is an antenna of another AP that is adjacent to or neighboring the antenna of the selected AP. In the exemplary embodiment, the term "adjacent" or "neighboring" means that there are no intervening antennas along a line-of-sight path between the adjacent or neighboring antennas. As indicated by block 108, the distance between a pair of such adjacent antennas is determined, and the information identifying the antennas, their channels and the distance between them is added to a list, which can be referred to for convenience as an "NAP" list. Each member of the NAP list can be described by the format or notation: NAP(X,Y,C_Y)=D_XY. In this notation, X is the antenna of the selected AP, Y is an antenna adjacent to the antenna of the selected AP, C_Y is the channel carried by the adjacent antenna, and D_XY is the distance between the adjacent antenna pair.

As well understood by persons skilled in the art, the distance between a pair of antennas can be determined in any of several well-known ways. For example, each antenna can broadcast a signal, which is received at the other antennas. The strengths of the signals received at the various other antennas can be compared with each other, and a triangulation calculation can be performed. As the manner in which the distances between adjacent antennas can be determined through, for example, triangulation, is well understood by persons skilled in the art, the details of such a method are not described herein. However, such a method can be summarized in the exemplary embodiment as follows: Signal strength data is gathered or collected by successively selecting and configuring the selected one of WLAN radio devices 86-88 to provide a transmission signal to a corresponding antenna port 84 while configuring the remaining ones of WLAN radio devices 86-88 to detect reception signals at corresponding antenna ports 84. The distances between pairs of antennas is triangulated using the gathered signal strength data. The distances can be compared with each other to ascertain the antenna arrangement or topology.

For example, in accordance with block 106 it can be determined in the exemplary embodiment that antenna ("B") 64 is adjacent to the antenna ("A") 62 of the selected AP. In the exemplary antenna arrangement shown in FIG. 1, the distance is the same between all pairs of adjacent antennas and is referred to as "d." In an example below of a calculation based on the distances between antenna pairs, a numerical value of "1" is used for the distance "d." Antenna ("B") 64 carries channel "2," and is a distance of "1" from the antenna ("A") 62 of the selected AP. Accordingly, as indicated by block 108, the following element or member is added to the aforementioned list of adjacent antenna pairs: NAP(A,B,2)=1. The method then returns to block 106, where it can be determined that antenna ("C") 66 is also adjacent to the antenna ("A") 64 of the selected AP. Antenna ("C") 66 carries channel "3," and is a distance of "1" from the selected antenna ("A") 62. Accordingly, as indicated by block 108, the following element or member is added to the aforementioned NAP list of adjacent antenna pairs: NAP(A,C,3)=1. Returning to block 106 again, it can be determined that there are no further antennas adjacent to antenna ("A") 62. The method therefore continues at block 110. Thus, the first time the sub-method (beginning at block 104) is performed in this example, the NAP list includes the elements shown in FIG. 5.

As indicated by block 110, it is determined whether there is a WLAN radio device of another AP (which can be referred to for convenience with regard to this step as AP "Y") that is adjacent to or neighboring the WLAN radio device of the selected AP X. In the exemplary embodiment, an "adjacent" or "neighboring" WLAN radio device Y is separated by no more than one row and/or one column from the WLAN radio device of the selected AP X. In the exemplary embodiment, the distance between such adjacent WLAN radio devices is defined as having a value of "1," i.e., a unit distance. As indicated by block 112, the information identifying the WLAN radios, their channels and the distance between them is added to a list, which can be referred to for convenience as an "RAP" list. Each member of the RAP list can be described by the format or notation: RAP(X,Y,C_Y)=D_XY. In this notation, X is the WLAN radio device of the selected AP, Y is a WLAN radio device adjacent to WLAN radio device of the selected AP, C_Y is the channel to which the adjacent WLAN radio device is set, and D_XY is the distance between the adjacent WLAN radio device pair.

For example, in accordance with block 110, it can be determined in the exemplary embodiment that WLAN radio device ("Q") 88 is adjacent to WLAN radio device ("P") 86 of the selected AP. WLAN radio device ("Q") 88 is set to channel "2," and is a distance of "1" from WLAN radio device ("P") 86 of the selected AP. Accordingly, as indicated by block 112, the following element or member is added to the list of adjacent WLAN radio device pairs: RAP(P,Q,2)=1. The method then returns to block 110, where it can be determined that WLAN radio device ("R") 90 is also adjacent to WLAN radio device ("P") 86 of the selected AP. WLAN radio device ("R") 90 is set to channel "3," and is a distance of "1" from WLAN radio device ("P") 86 of the selected AP. Accordingly, as indicated by block 112, the following element or member is added to the list of adjacent WLAN radio device pairs: RAP(P,R,3)=1. Returning to block 110 again, it can be determined that there are no further WLAN radio devices adjacent to WLAN radio device ("P") 86. The method therefore continues at block 114. Thus, the first time the sub-method (beginning at block 104) is performed in this example, the RAP list includes the members shown in FIG. 6.

As indicated by block 114, a channel is selected. For example, in the exemplary embodiment in which the channels are referred to as "1," "2" and "3," channel "1" can be selected first. As indicated by block 116, a sum is formed from the reciprocals of the NAP list elements in which the adjacent antenna carries the selected channel and the reciprocals of the RAP list elements in which the adjacent WLAN radio device is set to the selected channel. In an instance in which the NAP list does not contain an element having an adjacent antenna carrying the selected channel, the reciprocal is assigned a value of "0." For example, for the selected channel "1," there is no antenna carrying channel "1" that is adjacent to the antenna ("A") 62 of the selected AP. Likewise, for a selected channel "1," there is no WLAN radio device operating on channel "1" that is adjacent to the WLAN radio device ("P") 86 of the selected AP. Therefore, as illustrated in FIG. 7, the first sum for the selected AP, corresponding to channel "1," is 0+0=0.

Blocks 114, 116 and 118 define a loop, in which each channel is selected in turn. As indicated by block 118, it is determined whether all channels have been selected. If there are more channels yet to be selected, then the method returns to above-described block 114, and another channel is selected. For example, channel "2" can be selected next. Proceeding to block 116 again, a second sum is then formed in the manner described above. For the selected channel "2," there is an element in the NAP list (FIG. 5) representing an antenna operating on channel "2" that is adjacent to the antenna ("A") 62 of the selected AP: NAP(A,B,2)=1. Likewise, for the selected channel "2," there is an element in the RAP list (FIG. 6) representing an antenna operating on channel "2" that is adjacent to the antenna ("A") 62 of the selected AP: RAP(P,Q,2)=1. Therefore, as illustrated in FIG. 7, the second sum for the selected AP, corresponding to channel "2," is (1/1)+(1/1)=2.

Continuing to block 118 again in this example, it is determined that channel "3" remains to be selected. In accordance with block 116, a third sum is then formed in the manner described above. For the selected channel "3," there is an element in the NAP list (FIG. 5) representing an antenna operating on channel "3" that is adjacent to the antenna ("A") 62 of the selected AP: NAP(A,C,3)=1. Likewise, for the selected channel "3," there is an element in the RAP list (FIG. 6) representing an antenna operating on channel "3" that is adjacent to the antenna ("A") 62 of the selected AP: RAP(P,R,3)=1. Therefore, as illustrated in FIG. 7, the third sum for the selected AP, corresponding to channel "3," is (1/1)+(1/1)=2. In this example, it is then determined as indicated by block 118 that all channels have been selected. Accordingly, the method continues at block 120 (FIG. 4B).

As indicated by block 120, of the sums computed in accordance with block 116 for each channel and for the selected AP, the lowest sum is identified. More specifically, for the selected AP the channel corresponding to the lowest sum is identified. Referring briefly again to FIG. 7, the lowest sum from among the sums 0, 2 and 2 is 0, corresponding to channel "1." As indicated by block 122, it is then determined whether the identified channel differs from the channel previously identified for the selected AP, i.e., during the immediately preceding iteration of the loop comprising blocks 106-120. In this example, although there is no preceding iteration at this point in the method, the channel previously identified for the selected AP is the channel to which the selected AP was initialized (block 102). In this example, the selected AP, comprising antenna ("A") 62 and WLAN radio device ("P") 86, was initialized (block 102) to channel "1." As indicated by block 124, if the identified channel remains the same as the channel previously identified for the selected AP, the selected AP is set or configured to operate on that identified channel. Because in this example the identified channel for the selected AP remained "1," WLAN radio device ("P") 86 is set or configured to operate on the identified channel "1."

If it is determined (block 122) that the identified channel differs from the channel previously identified for the selected AP in the preceding iteration or initialization, then the method returns to above-described block 106. The loop comprising blocks 106-122 is repeated until it is determined (block 122) that the identified channel did not change.

As indicated by block 126, it is determined whether all APs have been selected. If there are more APs yet to be selected, then the method returns to above-described block 106, and another AP is selected. Continuing with the present example, the AP comprising WLAN radio device ("Q") 88 and corresponding antenna "B" 64 can be selected next. In accordance with block 106 it can be determined that antenna ("A") 62 is adjacent to the antenna ("B") 64 of the selected AP. Antenna ("A") 62 carries channel "1," and is a distance of "1" from the selected antenna ("B") 64. Accordingly, as indicated by block 108, the following element or member is added to the aforementioned list of adjacent antenna pairs: NAP(B,A,1)=1. The method then returns to block 106, where it can be determined that antenna ("C") 66 is also adjacent to the antenna ("B") 64 of the selected AP. Antenna ("C") 66 carries channel "3," and is a distance of "1" from the selected antenna ("B") 64. Accordingly, as indicated by block 108, the following element or member is added to the aforementioned NAP list of adjacent antenna pairs: NAP(B, C,3)=1. Returning to block 106 again, it can be determined that there are no further antennas adjacent to antenna ("B") 64. The method therefore continues at block 110. Thus, the second time the sub-method (beginning at block 104) is performed in this example, the NAP list includes the members shown in FIG. 8.

As indicated by block 110, it is determined whether there is a WLAN radio device of another AP that is adjacent to or neighboring the WLAN radio device of the selected AP. In accordance with block 110, it can be determined that WLAN radio device ("P") 86 is adjacent to WLAN radio device ("Q") 88 of the selected AP. WLAN radio device ("P") 86 is set to channel "1," and is a distance of "1" from WLAN radio device ("Q") 88 of the selected AP. Accordingly, as indicated by block 112, the following element or member is added to the aforementioned list of adjacent WLAN radio device pairs: RAP(Q,P,1)=1. The method then continues at block 110 again, where it can be determined that WLAN radio device ("R") 90 is also adjacent to WLAN radio device ("Q") 88 of the selected AP. WLAN radio device ("R") 90 is set to channel "3," and is a distance of 1/0.707 from WLAN radio device ("Q") 88 of the selected AP. Note that in the exemplary embodiment the distance between a pair of WLAN radio devices that are located exactly one column and one row apart from each other is 1/0.707. Accordingly, as indicated by block 112, the following element or member is added to the aforementioned RAP list of adjacent WLAN radio device pairs: RAP(Q,R,3)=1/0.707. Returning to block 106 again, it can be determined that there are no further WLAN radio devices adjacent to WLAN radio device ("Q") 88. The method therefore continues at block 114. Thus, the second time the sub-method (beginning at block 104) is performed in this example, the RAP list includes the members shown in FIG. 9.

As described above, blocks 114, 116 and 118 define a loop, in which each channel is selected in turn, and a corresponding sum of reciprocal values of NAP and RAP list members is computed. For a selected channel "1," it can be determined that there is an element in the NAP list (FIG. 8) representing an antenna operating on channel "1" that is adjacent to the antenna ("B") 64 of the selected AP: NAP (B,A,1)=1. Likewise, for the selected channel "1," it can be determined that there is an element in the RAP list (FIG. 9) representing a WLAN radio device operating on channel "1" that is adjacent to the WLAN radio device ("Q") 88 of the selected AP: RAP(Q,P,1)=1. Therefore, as illustrated in FIG. 10, the first sum for the selected AP, corresponding to channel "1," is (1/1)+(1/1)=2.

Next, for a selected channel "2," it can be determined that there is no antenna operating on channel "2" that is adjacent to the antenna ("B") 64 of the selected AP. Likewise, for a selected channel "2," there is no WLAN radio device operating on channel "2" that is adjacent to the WLAN radio device ("Q") 88 of the selected AP. Therefore, as illustrated in FIG. 10, the second sum for the selected AP, corresponding to channel "2," is 0+0=0.

For a selected channel "3," it can be determined that there is an element in the NAP list (FIG. 8) representing an antenna operating on channel "3" that is adjacent to the antenna ("B") 64 of the selected AP: NAP(B,C,3)=1. Likewise, for the selected channel "3," it can be determined that there is an element in the RAP list (FIG. 9) representing a WLAN radio device operating on channel "3" that is adjacent to the WLAN radio device ("Q") 88 of the selected AP: RAP(Q,R,3)=1/0.707. Therefore, as illustrated in FIG. 10, the third sum for the selected AP, corresponding to channel "3," is (1/1)+(0.707)=1.7.

As indicated by block 120, of the sums computed in accordance with block 116 for each channel and for the selected AP, the lowest sum and corresponding channel are identified. Referring briefly again to FIG. 10, the lowest sum from among the sums 2, 0, and 1.7 is 0, corresponding to channel "2." As indicated by block 122, it is then determined whether the identified channel differs from the channel previously identified for the selected AP, i.e., during the immediately preceding iteration of the loop comprising blocks 106-120. In this example, although there is no preceding iteration for the selected AP at this point in the method, the channel previously identified for the selected AP is the channel to which the selected AP was initialized (block 102). In this example, the selected AP, comprising antenna ("B") 64 and WLAN radio device ("Q") 88, was initialized (block 102) to channel "2." As indicated by block 124, if the identified channel remains the same as the channel previously identified for the selected AP, the selected AP is set or configured to operate on that identified channel. Because in this example the identified channel for the selected AP remained "2," WLAN radio device ("Q") 88 is set or configured to operate on the identified channel "2."

As described above, in the event it is determined (block 122) that the identified channel changed, then the loop comprising blocks 106-122 is repeated until it is determined that the identified channel did not change.

As indicated by block 126, it is determined whether all APs have been selected. If there are more APs yet to be selected, then the method returns to above-described block 106, and another AP is selected. Continuing with the present example, the AP comprising WLAN radio device ("R") 90 and corresponding antenna "C" 66 can be selected next. In accordance with block 106 it can be determined that antenna ("A") 62 is adjacent to the antenna ("C") 66 of the selected AP. Antenna ("A") 62 carries channel "1," and is a distance of "1" from the antenna ("C") 66 of the selected AP. Accordingly, as indicated by block 108, the following element or member is added to the aforementioned list of adjacent antenna pairs: NAP(C,A,1)=1. The method then returns to block 106, where it can be determined that antenna ("B") 64 is also adjacent to the antenna ("C") 66 of the selected AP. Antenna ("B") 64 carries channel "2," and is a distance of "1" from the antenna ("C") 66 of the selected AP. Accordingly, as indicated by block 108, the following element is added to the aforementioned NAP list of adjacent antenna pairs: NAP(C,B,2)=1. Returning to block 106 again, it can be determined that there are no further antennas adjacent to antenna ("C") 66. The method therefore continues at block 110. Thus, the third time the sub-method (beginning at block 104) is performed in this example, the NAP list includes the members shown in FIG. 11.

As indicated by block 110, it is determined whether there is a WLAN radio device of another AP that is adjacent to or neighboring the WLAN radio device of the selected AP. In accordance with block 110, it can be determined that WLAN radio device ("P") 86 is adjacent to WLAN radio device ("R") 90 of the selected AP. WLAN radio device ("P") 86 is set to channel "1," and is a distance of "1" from WLAN radio device ("R") 90 of the selected AP. Accordingly, as indicated by block 112, the following element or member is added to the list of adjacent WLAN radio device pairs: RAP(R,P,1)=1. The method then returns to block 110, where it can be determined that WLAN radio device ("Q") 90 is also adjacent to WLAN radio device ("R") 90 of the selected AP. WLAN radio device ("Q") 88 is on channel "2," and is a distance of 1/0.707 from WLAN radio device ("R") 90 of the selected AP. Accordingly, as indicated by block 112, the following element or member is added to the list of adjacent WLAN radio device pairs: RAP(R,Q,2)=1/0.707. Returning to block 106 again, it can be determined that there are no further WLAN radio devices adjacent to WLAN radio device ("R") 90. The method therefore continues at block 114. Thus, the third time the sub-method (beginning at block 104) is performed in this example, the RAP list includes the members shown in FIG. 12.

The method continues with the loop defined by blocks 114, 116 and 118 for the selected AP. For a selected channel "1," it can be determined that there is an element in the NAP list (FIG. 11) representing an antenna operating on channel "1" that is adjacent to the antenna ("C") 66 of the selected AP: NAP(C,A,1)=1. Likewise, for the selected channel "1," it can be determined that there is an element in the RAP list (FIG. 12) representing a WLAN radio device operating on channel "1" that is adjacent to the WLAN radio device ("R") 90 of the selected AP: RAP(R,P,1)=1. Therefore, as illustrated in FIG. 13, the first sum for the selected AP, corresponding to channel "1," is (1/1)+(1/1)=2.

Next, for a selected channel "2," it can be determined that there is an element in the NAP list (FIG. 11) representing an antenna operating on channel "2" that is adjacent to the antenna ("C") 66 of the selected AP: NAP(C,B,2)=1. Likewise, for the selected channel "2," it can be determined that there is an element in the RAP list (FIG. 12) representing a WLAN radio device operating on channel "2" that is adjacent to the WLAN radio device ("R") 90 of the selected AP: RAP(R,Q,2)=1/0.707. Therefore, as illustrated in FIG. 13, the second sum for the selected AP, corresponding to channel "2," is (1/1)+(0.707)=1.7.

Next, for a selected channel "3," it can be determined that there is no antenna operating on channel "3" that is adjacent to the antenna ("C") 66 of the selected AP. Likewise, for a selected channel "3," it can be determined that there is no WLAN radio device operating on channel "3" that is adjacent to the WLAN radio device ("R") 90 of the selected AP. Likewise, as illustrated in FIG. 13, the second sum for the selected AP, corresponding to channel "3," is 0+0=0.

As indicated by block 120, of the sums computed in accordance with block 116 for each channel and for the selected AP, the lowest sum and corresponding channel are identified. Referring briefly again to FIG. 13, the lowest sum from among the sums 2, 1.7 and 0 is 0, corresponding to channel "3." As indicated by block 122, it is then determined whether the identified channel differs from the channel previously identified for the selected AP, i.e., during the immediately preceding iteration of the loop comprising blocks 106-120. In this example, although there is no preceding iteration for the selected AP, the channel previously identified for the selected AP is the channel to which the selected AP was initialized (block 102). In this example, the selected AP, comprising antenna ("C") 66 and WLAN radio device ("R") 90, was initialized (block 102) to channel "3." As indicated by block 124, if the identified channel remains the same as the channel previously identified for the selected AP, the selected AP is set or configured to operate on that identified channel. Because in this example the identified channel for the selected AP remained "3," WLAN radio device ("R") 90 is set or configured to operate on the identified channel "3." As described above, in the event it is determined (block 122) that the identified channel changed, then the loop comprising blocks 106-122 is repeated until it is determined that the identified channel did not change.

As indicated by block 126, it is determined whether all APs have been selected. If there are more APs yet to be selected, then the method returns to above-described block 106, and another AP is selected. However, in this example, all of the APs have been selected. Therefore, the method ends. As a result of the method in this example, WLAN radio device ("P") 86 has been set or configured to operate on channel "1"; WLAN radio device ("Q") 88 has been set or configured to operate on channel "2"; and WLAN radio device ("R") 90 has been set or configured to operate on channel "3." It can be appreciated that in other embodiments, having other numbers of radio devices and antennas arranged in manners other than as described above, the method similarly can select channels in a manner that promotes minimization of signal interference between adjacent WLAN radio devices and between adjacent antennas.

In view of the foregoing description of an exemplary method, persons skilled in the art will be capable of providing software, firmware or other logic that contributes to configuring the processing system, comprising processor 74 and memory 76, in a manner that causes network switch device 60 to perform the method. Such software or firmware can be loaded into memory 76 or other memory (not shown) for execution by processor 74 in any suitable manner, such as during a configuration procedure preceding the above-described method of operation. It should be understood that the combination of memory 76 and the software, firmware, instructions, etc., underlying the logic elements, as stored in memory 76 in non-transitory computer-readable form, defines a "computer program product" as that term is understood in the patent lexicon.

One or more illustrative or exemplary embodiments of the invention have been described above. However, it is to be understood that the invention is defined by the appended claims and is not limited to the specific embodiments described.

What is claimed is:

1. A device, comprising:
   a housing;
   a plurality of wireless local area network (WLAN) radio devices mounted within the housing, each WLAN radio device configurable to operate on one of a plurality of channels, each WLAN radio device coupled to one of a plurality of antenna ports on the housing;
   wired-network switch circuitry mounted within the housing and coupled to the plurality of WLAN radio devices;
   a processing system comprising a processor and memory mounted within the housing, the processing system configured to control a method comprising:
   determining distances between pairs of antennas coupled to the antenna ports;
   determining distances between pairs of the WLAN radio devices; and
   assigning a channel to each WLAN radio device in response to determining the distances between pairs of the antennas and the distances between pairs of the WLAN radio devices.

2. The device of claim 1, wherein determining distances between pairs of antennas comprises:
   gathering signal strength data by successively configuring a selected one of the plurality of WLAN radio devices to provide a transmission signal to a corresponding antenna port while configuring all others of the plurality of WLAN radio devices to detect reception signals at corresponding antenna ports; and
   triangulating the distances between the pairs of antennas coupled to the antenna ports based on gathered signal strength data.

3. The device of claim 1, wherein the plurality of WLAN radio devices are arranged in a rectangular array within the housing.

4. The device of claim 3, wherein determining distances between pairs of WLAN radio devices comprises identifying WLAN radio devices separated from one another by no more than one row or one column of the rectangular array.

5. The device of claim 1, wherein assigning a channel to each wireless network radio device comprises, for each WLAN radio device and corresponding antenna:
   forming a first list comprising information identifying adjacent antennas and channels assigned thereto;
   forming a second list comprising information identifying adjacent WLAN radio devices and channels assigned thereto;
   for each channel, forming a sum based on distances between adjacent antennas and distances between adjacent WLAN radio devices;
   identifying a minimum value from among a plurality of sums;
   assigning a candidate channel to a WLAN radio device and antenna, the candidate channel corresponding to the minimum value;

iteratively repeating the steps of forming the first list, forming the second list, forming the sum, identifying the minimum value, and assigning a candidate channel until it is determined that the candidate channel assigned to a WLAN radio device does not change between two successive iterations; and configuring the WLAN radio device to operate on the candidate channel when it is determined that the candidate channel assigned to a WLAN radio device does not change between two successive iterations.

6. The device of claim 5, wherein forming a sum comprises forming a sum of reciprocals of distances between adjacent antennas and reciprocals of distances between adjacent WLAN radio devices.

7. The device of claim 1, further comprising filter circuitry configured to split WLAN signals and cellular telephone signals.

8. A method for operation of network switch device, the network switch device comprising a housing, a plurality of wireless local area network (WLAN) radio devices mounted within the housing, wired-network switch circuitry mounted within the housing and coupled to the plurality of WLAN radio devices, and a processing system comprising a processor and memory mounted within the housing, wherein each WLAN radio device is configurable to operate on one of a plurality of channels, and each WLAN radio device is coupled to one of a plurality of antenna ports on the housing, the method comprising:

the processing system determining distances between pairs of antennas coupled to the antenna ports;

the processing system determining distances between pairs of the WLAN radio devices; and the processing system assigning a channel to each WLAN radio device in response to determining the distances between pairs of the antennas and the distances between pairs of the WLAN radio devices.

9. The method of claim 8, wherein determining distances between pairs of antennas comprises:

gathering signal strength data by successively configuring a selected one of the plurality of WLAN radio devices to provide a transmission signal to a corresponding antenna port while configuring all others of the plurality of WLAN radio devices to detect reception signals at corresponding antenna ports; and triangulating the distances between the pairs of antennas coupled to the antenna ports based on gathered signal strength data.

10. The method of claim 8, wherein the plurality of WLAN radio devices are arranged in a rectangular array within the housing.

11. The method of claim 10, wherein determining distances between pairs of WLAN radio devices comprises identifying WLAN radio devices separated from one another by no more than one row or one column of the rectangular array.

12. The method of claim 8, wherein assigning a channel to each wireless network radio device comprises, for each WLAN radio device and corresponding antenna:

forming a first list comprising information identifying adjacent antennas and channels assigned thereto;

forming a second list comprising information identifying adjacent WLAN radio devices and channels assigned thereto;

for each channel, forming a sum based on distances between adjacent antennas and distances between adjacent WLAN radio devices;

identifying a minimum value from among a plurality of sums;

assigning a candidate channel to a WLAN radio device and antenna, the candidate channel corresponding to the minimum value;

iteratively repeating the steps of forming the first list, forming the second list, forming the sum, identifying the minimum value, and assigning a candidate channel until it is determined that the candidate channel assigned to a WLAN radio device does not change between two successive iterations; and configuring the WLAN radio device to operate on the candidate channel when it is determined that the candidate channel assigned to a WLAN radio device does not change between two successive iterations.

13. The method of claim 12, wherein forming a sum comprises forming a sum of reciprocals of distances between adjacent antennas and reciprocals of distances between adjacent WLAN radio devices.

14. The method of claim 8, further comprising filter circuitry configured to split WLAN signals and cellular telephone signals.

15. A computer program product for operating a network switch device comprising a housing, a plurality of wireless local area network (WLAN) radio devices, wired-network switch coupled to the plurality of WLAN radio devices, and a processing system, wherein each WLAN radio device is configurable to operate on one of a plurality of channels, and each WLAN radio device is coupled to one of a plurality of antenna ports on the housing, the computer program product comprising a non-transitory computer-readable medium having stored thereon in non-transitory computer-readable form instructions that when executed by the processing system cause the processing system to control a method comprising:

determining distances between pairs of antennas coupled to the antenna ports;

determining distances between pairs of the WLAN radio devices; and assigning a channel to each WLAN radio device in response to determining the distances between pairs of the antennas and the distances between pairs of the WLAN radio devices.

16. The computer program product of claim 15, wherein determining distances between pairs of antennas comprises:

gathering signal strength data by successively configuring a selected one of the plurality of WLAN radio devices to provide a transmission signal to a corresponding antenna port while configuring all others of the plurality of WLAN radio devices to detect reception signals at corresponding antenna ports; and triangulating the distances between the pairs of antennas coupled to the antenna ports based on gathered signal strength data.

17. The computer program product of claim 15, wherein:

the plurality of WLAN radio devices are arranged in a rectangular array within the housing; and determining distances between pairs of WLAN radio devices comprises identifying WLAN radio devices separated from one another by no more than one row or one column of the rectangular array.

18. The computer program product of claim 15, wherein assigning a channel to each wireless network radio device comprises, for each WLAN radio device and corresponding antenna:

forming a first list comprising information identifying adjacent antennas and channels assigned thereto;

forming a second list comprising information identifying adjacent WLAN radio devices and channels assigned thereto;

for each channel, forming a sum based on distances between adjacent antennas and distances between adjacent WLAN radio devices;

identifying a minimum value from among a plurality of sums;

assigning a candidate channel to a WLAN radio device and antenna, the candidate channel corresponding to the minimum value;

iteratively repeating the steps of forming the first list, forming the second list, forming the sum, identifying the minimum value, and assigning a candidate channel until it is determined that the candidate channel assigned to a WLAN radio device does not change between two successive iterations; and configuring the WLAN radio device to operate on the candidate channel when it is determined that the candidate channel assigned to a WLAN radio device does not change between two successive iterations.

19. The computer program product of claim 18, wherein forming a sum comprises forming a sum of reciprocals of distances between adjacent antennas and reciprocals of distances between adjacent WLAN radio devices.

* * * * *